United States Patent
Shiba

(10) Patent No.: US 8,467,924 B2
(45) Date of Patent: Jun. 18, 2013

(54) CONTROL APPARATUS AND CONTROL METHOD FOR HYBRID VEHICLE

(75) Inventor: Kenjiro Shiba, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 199 days.

(21) Appl. No.: 12/988,580

(22) PCT Filed: Jun. 10, 2009

(86) PCT No.: PCT/JP2009/060579
§ 371 (c)(1),
(2), (4) Date: Oct. 19, 2010

(87) PCT Pub. No.: WO2009/157308
PCT Pub. Date: Dec. 30, 2009

(65) Prior Publication Data
US 2011/0082611 A1 Apr. 7, 2011

(30) Foreign Application Priority Data
Jun. 27, 2008 (JP) .................................. 2008-168709

(51) Int. Cl.
*B60L 9/00* (2006.01)
*B60L 11/00* (2006.01)

(52) U.S. Cl.
USPC ................. 701/22; 290/40 C; 290/45; 307/45

(58) Field of Classification Search
USPC ............................................. 701/22; 290/45
See application file for complete search history.

(56) References Cited

U.S. PATENT DOCUMENTS

| 5,710,699 A | 1/1998 | King et al. |
| 5,969,624 A * | 10/1999 | Sakai et al. ................. 340/636.1 |
| 6,608,396 B2 * | 8/2003 | Downer et al. ............. 290/40 C |
| 2009/0160248 A1 | 6/2009 | Ang |

FOREIGN PATENT DOCUMENTS

| JP | A-2002-10502 | 1/2002 |
| JP | A-2003-209969 | 7/2003 |
| JP | A-2007-98981 | 4/2007 |
| JP | A-2008-42983 | 2/2008 |

OTHER PUBLICATIONS

International Search Report dated Sep. 15, 2009 in International Patent Application No. PCT/JP2009/060579.

* cited by examiner

*Primary Examiner* — Thomas Tarcza
*Assistant Examiner* — Tyler J Lee
(74) *Attorney, Agent, or Firm* — Oliff & Berridge, PLC

(57) ABSTRACT

In a hybrid vehicle including: a first battery; a first boost converter for converting an output voltage of the first battery and outputting the output voltage to a motor generator; a second battery; and a second boost converter for converting an output voltage of the second battery and outputting the output voltage to the motor generator, an ECU performs HV drive control for driving the hybrid vehicle by using driving power of both an engine and the motor generator, and stops the second boost converter, when an SOC(1) that is a value indicating a state of charge of the first battery is smaller than a threshold value α or when an SOC(2) that is a value indicating a state of charge of the second battery is smaller than a threshold value β.

22 Claims, 6 Drawing Sheets

8,467,924 B2

CONTROL APPARATUS AND CONTROL METHOD FOR HYBRID VEHICLE

TECHNICAL FIELD

The present invention relates to power control over a hybrid vehicle. In particular, the present invention relates to power control over a hybrid vehicle including a plurality of units each having a power storage device and a voltage converting device for converting an output voltage of the power storage device and outputting the output voltage to a motor for driving.

BACKGROUND ART

A hybrid vehicle having an internal combustion engine and an electric motor as power sources includes a vehicle having a power supply system in which a voltage converting device boosts a low output voltage of a power storage device and supplies the boosted high-voltage electric power to a motor for driving. Japanese Patent Laying-Open No. 2003-209969 (Patent Document 1), for example, discloses a technique related to power control over such a hybrid vehicle including a plurality of units each having the power storage device and the voltage converting device.

A power supply control system disclosed in Japanese Patent Laying-Open No. 2003-209969 includes: an inverter for converting DC power to AC power and supplying the AC power to an electric traction motor; a plurality of power supply stages for providing DC power to the inverter, each stage having a battery and a voltage converting device and the stages being wired in parallel; and a controller for controlling the plurality of power supply stages. The controller controls the plurality of power supply stages such that the batteries of the plurality of power supply stages are equally charged/discharged and the plurality of power supply stages maintain an output voltage to the inverter.

PRIOR ART DOCUMENTS

Patent Documents

Patent Document 1: Japanese Patent Laying-Open No. 2003-209969
Patent Document 2: Japanese Patent Laying-Open No. 2002-10502

SUMMARY OF THE INVENTION

Problems to be Solved by the Invention

When the plurality of power supply stages are equally charged/discharged as in the power supply control system disclosed in Japanese Patent Laying-Open No. 2003-209969, however, a power loss caused by switching at the voltage converting devices occurs constantly at the plurality of power supply stages, resulting in an increase in energy loss and poor fuel economy.

The present invention has been made to solve the above problems, and an object thereof is to provide, in a hybrid vehicle including a plurality of units each having a power storage device and a voltage converting device for converting an output voltage of the power storage device and outputting the output voltage to a rotating electric machine for driving, a control apparatus and a control method that allow suppression of a power loss in the voltage converting devices and enhancement of fuel economy.

Means for Solving the Problems

A control apparatus according to the present invention controls a hybrid vehicle using at least any one of an internal combustion engine and a rotating electric machine as a power source. The hybrid vehicle includes: a first power storage device; a first voltage converting device for converting an output voltage of the first power storage device and outputting the output voltage to the rotating electric machine; a second power storage device; and a second voltage converting device for converting an output voltage of the second power storage device and outputting the output voltage to the rotating electric machine. The control apparatus includes: a drive control unit for performing any one of hybrid drive control for driving the hybrid vehicle by using driving power of both the internal combustion engine and the rotating electric machine, and electric drive control for driving the hybrid vehicle by using only driving power of the rotating electric machine; and a control unit for controlling the first voltage converting device and the second voltage converting device to actuate both the first voltage converting device and the second voltage converting device during the electric drive control by the drive control unit, and to actuate the first voltage converting device and stop the second voltage converting device during the hybrid drive control by the drive control unit.

Preferably, the first voltage converting device and the second voltage converting device are coupled in parallel to the rotating electric machine. The first voltage converting device has a first switching element and a second switching element serially coupled to the rotating electric machine. A positive electrode of the first power storage device is coupled to an intermediate point between the first switching element and the second switching element, and a negative electrode of the first power storage device is coupled to a negative electrode side of the second switching element. The control unit actuates the first voltage converting device to maintain the first switching element in an ON state and the second switching element in an OFF state, when the output voltage of the first power storage device is larger than the output voltage of the second power storage device during the hybrid drive control.

More preferably, the control unit determines whether or not an ON time period during which the first switching element can be maintained in the ON state decreases due to fluctuations in the output voltage of at least any one of the first power storage device and the second power storage device, during the hybrid drive control and while the second voltage converting device is in a stopped state, and when determining that the ON time period decreases, the control unit temporarily actuates the second voltage converting device such that electric power of the second power storage device is output to the rotating electric machine.

More preferably, the control unit determines that the ON time period decreases and temporarily actuates the second voltage converting device when a value indicating a state of charge of the second power storage device exceeds a predetermined first threshold value during the hybrid drive control, and stops the second voltage converting device again when the value indicating the state of charge of the second power storage device falls below a predetermined second threshold value during temporary actuation of the second voltage converting device.

More preferably, the control unit calculates a requested power value of the rotating electric machine, and temporarily actuates the second voltage converting device only for a time period during which the requested power value exceeds a predetermined requested power value.

More preferably, the control unit actuates the second voltage converting device such that discharging power of the second power storage device becomes larger than discharging power of the first power storage device, when the control unit temporarily actuates the second voltage converting device.

More preferably, the first voltage converting device and the second voltage converting device are coupled in parallel to the rotating electric machine. The control unit actuates the first voltage converting device such that an output voltage of the first voltage converting device becomes larger than the output voltage of the second power storage device, when the output voltage of the first power storage device is smaller than the output voltage of the second power storage device during the hybrid drive control.

More preferably, the control unit calculates a regenerative power value generated by the rotating electric machine, and temporarily actuates the second voltage converting device such that the first power storage device and the second power storage device are both charged with regenerative power generated by the rotating electric machine, when the regenerative power value exceeds a predetermined power value during the hybrid drive control and while the second voltage converting device is in a stopped state.

More preferably, the predetermined power value is determined based on a charge allowable power value of the first power storage device.

More preferably, the control unit actuates the second voltage converting device such that the second power storage device is charged with electric power exceeding a charge allowable power value of the first power storage device out of the regenerative power, when the control unit temporarily actuates the second voltage converting device.

More preferably, the drive control unit determines whether or not a value indicating a state of charge of any one of the first power storage device and the second power storage device is smaller than a prescribed value, and performs the hybrid drive control when the drive control unit determines that the value indicating the state of charge is smaller than the prescribed value, and performs the electric drive control when the drive control unit does not determine that the value indicating the state of charge is smaller than the prescribed value.

EFFECTS OF THE INVENTION

According to the present invention, at the time of a shift from the electric drive control to the hybrid drive control due to a decrease in the value indicating the state of charge of each power storage device (the amount of charging), the operation of the first voltage converting device is continued and the second voltage converting device is stopped. As a result, the power loss produced in the voltage converting devices can be suppressed.

MODES FOR CARRYING OUT THE INVENTION

Figure 1:
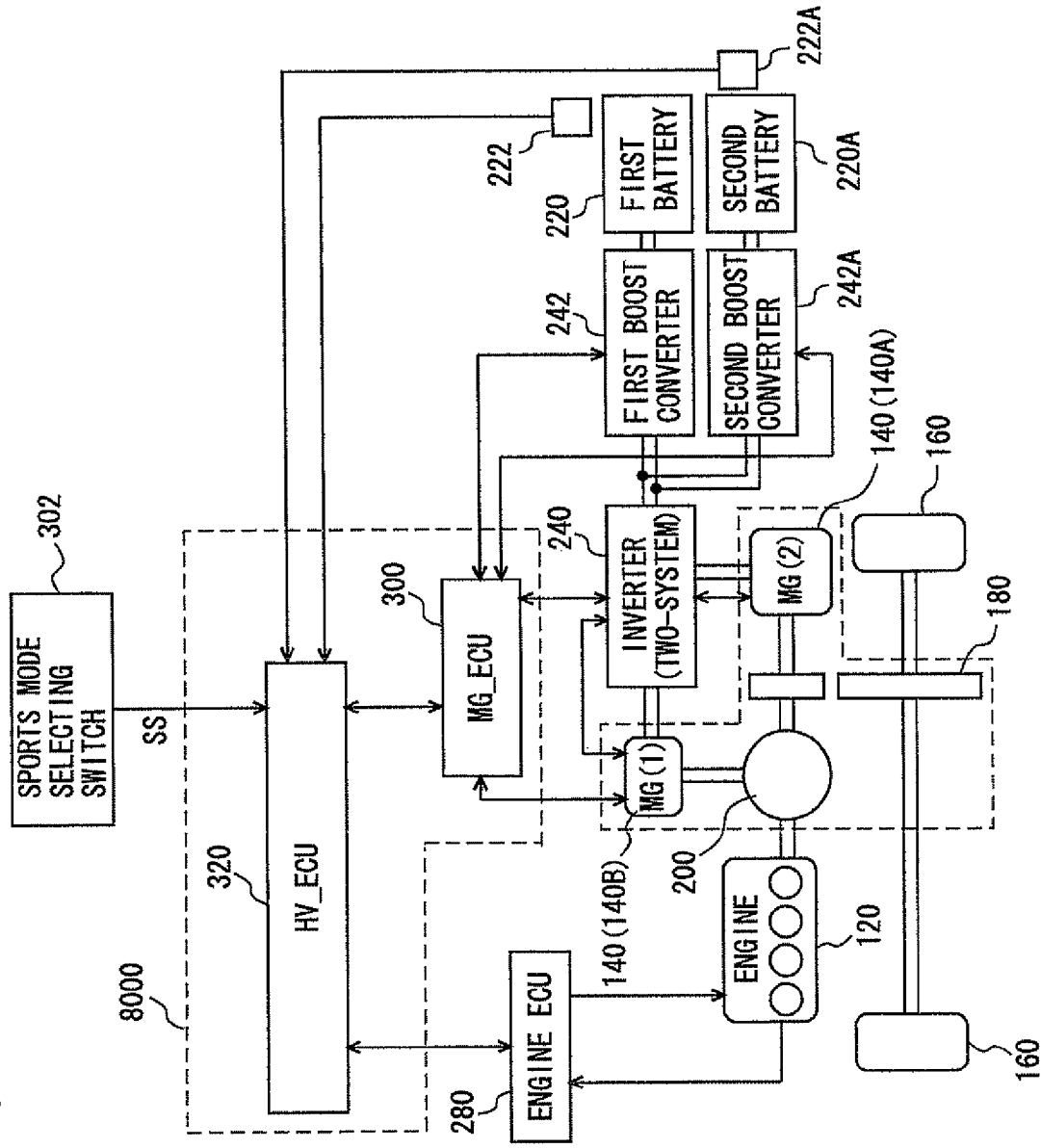
FIG. 1 is a control block diagram of a hybrid vehicle including a control apparatus according to a first embodiment of the present invention.

Embodiments of the present invention will be described hereinafter with reference to the drawings. In the following description, the same components are denoted with the same reference characters. Their names and functions are also the same. Therefore, detailed description on them will not be repeated.

<First Embodiment>

A control block diagram of an overall hybrid vehicle including a control apparatus according to a first embodiment of the present invention will be described with reference to FIG. 1. It is noted that the present invention is not limited to the hybrid vehicle shown in FIG. 1. The present invention may be applied to a vehicle whose internal combustion engine as a power source, such as a gasoline engine (hereinafter described as an engine) serves both as a driving source for causing the vehicle to run and as a driving source of a generator. The present invention may alternatively be applied to a vehicle that is powered by the engine and a motor generator and that can run by using driving power of the motor generator (either with or without the engine stopped), or a hybrid vehicle having a different mode on which a battery for driving is mounted (not limited to so-called series-type or parallel-type hybrid vehicles). Furthermore, the present invention is also applicable to an electric vehicle and a fuel cell vehicle that do not have an engine. It is noted that a battery of the hybrid vehicle is a nickel-metal hydride battery, a lithium ion battery or the like, and the type thereof is not particularly limited. In addition, a large-capacitance capacitor may be used instead of the battery. Furthermore, the number of units of power supply circuits (hereinafter sometimes referred to as a power supply system) including the battery may be two or more.

The hybrid vehicle includes an engine 120 and a motor generator (MG) 140. Motor generator 140 is a three-phase AC motor. It is noted that, in the following, for convenience of description, motor generator 140 will sometimes be separated into and referred to as a motor generator 140A (or MG(2) 140A) and a motor generator 140B (or MG(1) 140B). MG(2) 140A and MG(1) 140B function as a generator or as a motor, depending on the driving state of the hybrid vehicle. When these motor generators function as the generator, regenerative braking is performed. When the motor generators function as the generator, kinetic energy of the vehicle is converted to electrical energy and the speed of the vehicle is reduced.

In addition to the above components, the hybrid vehicle includes: a reduction gear 180 that transfers driving power generated at engine 120 and motor generator 140 to a driving wheel 160 or transfers drive of driving wheel 160 to engine 120 and motor generator 140; a power split device 200 that splits driving power generated by engine 120 into two routes of driving wheel 160 and MG(1) 140B; a first battery 220 for driving and a second battery 220A for driving that store electric power for driving motor generator 140; monitoring units 222 and 222A that monitor states of first battery 220 and second battery 220A, respectively; a two-system inverter 240 that performs current control while making a conversion between a direct current of first battery 220 and second battery 220A and an alternating current of MG(2) 140A and MG(1) 140B; an engine ECU 280 that controls an operating state of engine 120; an MG_ECU 300 that controls motor generator 140, inverter 240 and the like depending on the state of the hybrid vehicle; an HV_ECU 320 that mutually manages and controls engine ECU 280, MG_ECU 300 and the like, and controls the overall hybrid system such that the hybrid vehicle can run in the most efficient manner; and the like.

Although each ECU is described as a separate configuration in FIG. 1, ECUs may be configured as a single ECU by integrating two or more ECUs. For example, one example thereof is an ECU 8000 implemented by integrating MG_ECU 300 and HV_ECU 320 as shown by a dotted line in FIG. 1. In the following description, the ECUs will be referred to as ECU 8000 without making a distinction between MG_ECU 300 and HV_ECU 320.

A first, boost converter 242 is provided between first battery 220 and inverter 240, and a second boost converter 242A is provided between second battery 220A and inverter 240. Since rating voltages of first battery 220 and second battery 220A are lower than rating voltages of MG(2) 140A and MG(1) 140B, ECU 8000 boosts electric power of first battery 220 and second battery 220A by means of first boost converter 242 and second boost converter 242A when the electric power is supplied from first battery 220 and second battery 220A to MG(2) 140A and MG(1) 140B. It is noted that, when first battery 220 and second battery 220A are charged with regenerative power generated by MG(2) 140A and MG(1) 140B, ECU 8000 steps down the regenerative power by means of these boost converters.

A sports mode selecting switch 302 is connected to ECU 8000. Sports mode selecting switch 302 detects whether or not the driver selects the driving in the sports mode in which, importance is placed on acceleration performance, and outputs a signal SS indicating the result of detection to ECU 8000.

As power split device 200, a planetary gear mechanism (planetary gear) is used to divide the driving power of engine 120 into both driving wheel 160 and MG(1) 140B. By controlling the rotation speed of MG(1) 140B, power split device 200 also functions as a continuously variable transmission. In order to stop rotating engine 120, rotation energy of engine 120 is converted to electrical energy at MG(1) 140B to reduce the rotation speed of engine 120.

As the drive mode, the hybrid vehicle has an electric vehicle drive mode (hereinafter also referred to as an EV drive mode) in which the hybrid vehicle runs by using only the driving power of motor generator 140, and a hybrid vehicle drive mode (hereinafter also referred to as an HV drive mode) in which the hybrid vehicle runs by using the driving power of motor generator 140 and the driving power of engine 120. In the following description, control for driving the hybrid vehicle in the EV drive mode will be referred to as EV drive control, and control for driving the hybrid vehicle in the HV drive mode will be referred to as HV drive control.

For example, when electric power sufficient to meet the driver's request can be supplied from first battery 220 and second battery 220A to motor generator 140, ECU 8000 stops engine 120 and performs the EV drive control. In this case, the hybrid vehicle can be driven by using only MG(2) 140A if engine 120 has low efficiency at the time of starting, at the time of low-speed driving and the like.

During the HV drive mode, the driving power of engine 120 is divided into two routes by, for example, power split device 200. One part of the divided driving power is used to directly drive driving wheel 160 and the other part is used to drive MG(1) 140B for power generation. At this time, the electric power generated by MG(1) 140B is used to drive MG(2) 140A and assist the drive of driving wheel 160. At the time of high-speed driving, the electric power from first battery 220 and/or second battery 220A is further supplied to MG(2) 140A to increase an output of MG(2) 140A, so that additional driving force is provided to driving wheel 160. On the other hand, at the time of deceleration, MG(2) 140A driven by driving wheel 160 functions as the generator to perform regeneration, and stores the recovered electric power in first battery 220 and/or second battery 220A.

In addition, during the HV drive mode, in order to suppress degradation of first battery 220 and second battery 220A, ECU 8000 controls power generation and regeneration as well as a motor output by motor generator 140 such that SOCs (States of Charge) of first battery 220 and second battery 220A fall within a prescribed control range (e.g., from approximately 20% of a control lower limit value to approximately 60% of a control upper limit value). For example, when it is necessary to charge first battery 220 and/or second battery 220A, ECU 8000 increases an output of engine 120 and increases the amount of electric power generated by MG(1) 140B, thereby increasing the amount of charging of first battery 220 and/or second battery 220A.

Figure 2:
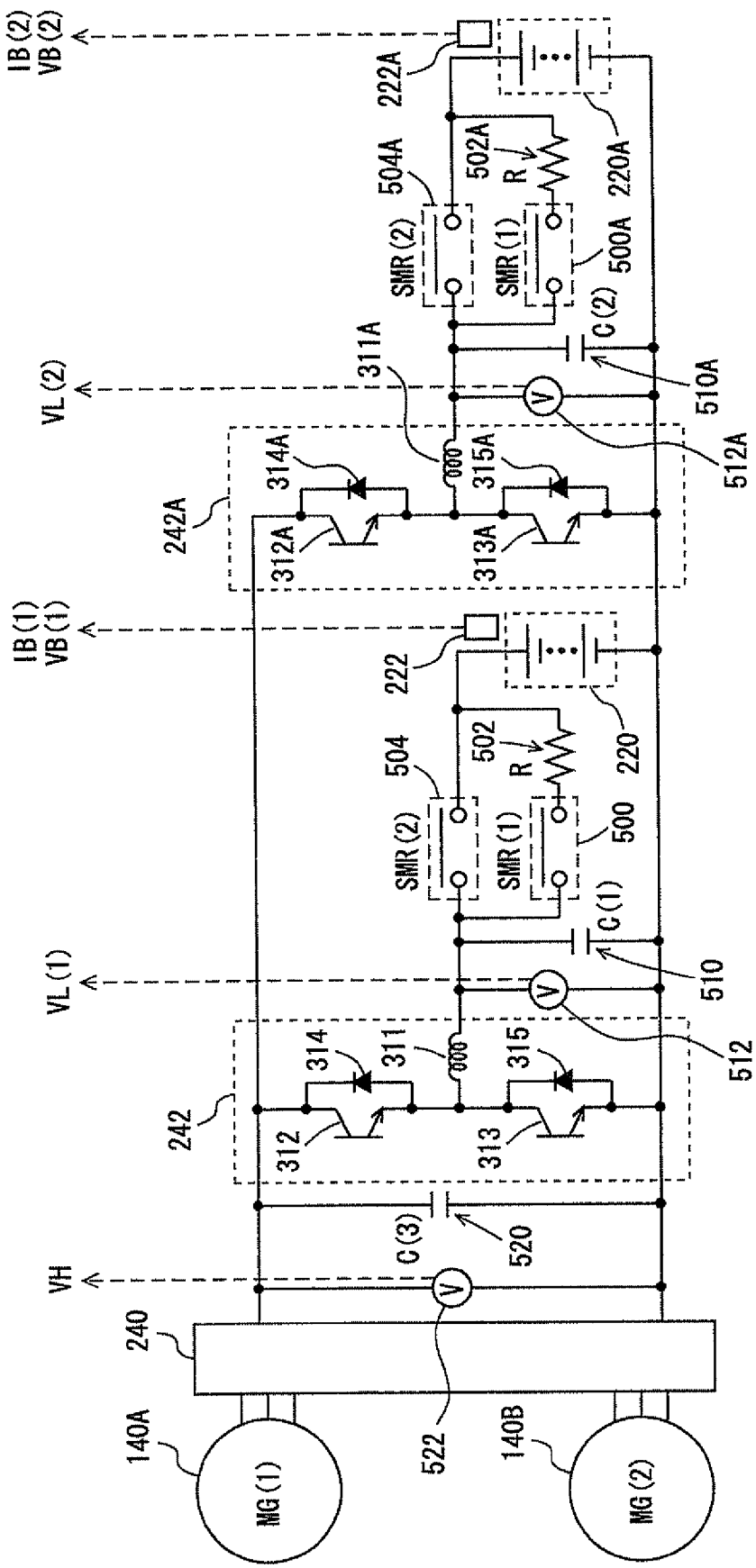
FIG. 2 illustrates a configuration of a power supply circuit controlled by the control apparatus according to the first embodiment of the present invention.

The power supply circuit controlled by the control apparatus according to the embodiment of the present invention will be described with reference to FIG. 2. This power supply circuit includes first battery 220 and first boost converter 242, second battery 220A and second boost converter 242A, inverter 240, a capacitor C(1) 510, a capacitor C(2) 510A, a capacitor C(3) 520, SMRs(1) 500 and 500A, limiting resistors 502 and 502A, and SMRs(2) 504 and 504A.

Specifications of first battery 220 are set to be different from those of second battery 220A in terms of the charge allowable power/discharge allowable power (expressed in the unit "watt") and the power storage capacity (expressed in the unit "ampere hour"). For example, the charge allowable power/discharge allowable power of first battery 220 is set to be larger than that of second battery 220A, and the power storage capacity of second battery 220A is set to be larger than that of first battery 220. It is noted that these specifications are by way of example and are not particularly limited thereto. In addition, first battery 220 and second battery 220A may have the same specifications.

Based on a control signal from ECU 8000, inverter 240 converts a current supplied from first battery 220 and second battery 220A from a DC current to an AC current, and supplies the AC current to motor generator 140.

First boost converter 242 (in this paragraph, the configuration of second boost converter 242A is parenthesized) includes a reactor 311 (a reactor 311A), NPN transistors 312 and 313 (NPN transistors 312A and 313A), and diodes 314 and 315 (diodes 314A and 315A). Reactor 311 (reactor 311A) has one end connected to a power supply line of first battery 220 (second battery 220A), and the other end connected to an intermediate point between NPN transistor 312 (NPN transistor 312A) and NPN transistor 313 (NPN transistor 313A), that is, between an emitter of NPN transistor 312 (NPN transistor 312A) and a collector of NPN transistor 313 (NPN transistor 313A). NPN transistors 312 and 313 (NPN transistors 312A and 313A) are serially connected between a power supply line and an earth line of inverter 240. NPN transistor 312 (NPN transistor 312A) has a collector connected to the power supply line, and NPN transistor 313 (NPN transistor 313A) has an emitter connected to the earth line. In addition, between the collector and the emitter of NPN transistor 312 (NPN transistor 312A) as well as between the collector and the emitter of NPN transistor 313 (NPN transistor 313A), diodes 314 and 315 (diodes 314A and 315A) for causing a current to flow from the emitter side to the collector side are connected, respectively.

It is noted that, in the following description, NPN transistors 312 and 312A are sometimes referred to as upper arms 312 and 312A, respectively, and NPN transistors 313 and 313A are sometimes referred to as lower arms 313 and 313A, respectively.

Capacitor C(1) 510 and capacitor C(2) 510A are each connected in parallel to inverter 240. Capacitor C(1) 510 and capacitor C(2) 510A temporarily store electric charge in order to smooth electric power supplied from each of first battery 220 and second battery 220A or electric power supplied from inverter 240. The smoothed electric power is supplied to inverter 240 (at the time of motor driving) or to first battery 220 and second battery 220A (at the time of regenerative braking).

Capacitor C(3) 520 smoothes a voltage of DC power supplied from first boost converter 242 and/or second boost converter 242A, and supplies the smoothed DC power to inverter 240.

ECU 8000 boosts DC voltages of capacitor C(1) 510 and capacitor C(2) 510A and supplies the DC voltages to capacitor C(3) 520 by controlling actuation of first boost converter 242 (ON/OFF of upper arm 312 and lower arm 313) and actuation of second boost converter 242A (ON/OFF of upper arm 312A and lower arm 313A).

When boosting the DC voltage of capacitor C(1) 510 and supplying the DC voltage to capacitor C(3) 520, ECU 8000 performs switching of upper arm 312 and lower arm 313 of first boost converter 242 (switching between OFF and ON) at a prescribed cycle. In addition, when boosting the DC voltage of capacitor C(2) 510A and supplying the DC voltage to capacitor C(3) 520, ECU 8000 similarly performs switching of upper arm 312A and lower arm 313A of second boost converter 242A at a prescribed cycle. It is noted that, as a result of such switching, a power loss produced in each converter increases.

SMRs(1) 500 and 500A as well as SMRs(2) 504 and 504A are relays whose contact points are closed when an exciting current flows through coils.

SMR(1) 500 and SMR(2) 504 are provided at the positive electrode of first battery 220. SMR(1) 500 and SMR(2) 504 are connected in parallel. Limiting resistor 502 is serially connected to SMR(1) 500. SMR(1) 500 is an SMR for precharge that is connected prior to connection of SMR(2) 504 and prevents an inrush current from flowing into inverter 240. SMR(2) 504 is connected in parallel to SMR(1) 500 and limiting resistor 502, and is connected after precharge ends. Each SMR is controlled by ECU 8000.

Similarly, SMR(1) 500A and SMR(2) 504A are provided at the positive electrode of second battery 220A. SMR(1) 500A and SMR(2) 504A are connected in parallel. Limiting resistor 502A is serially connected to SMR(1) 500A. SMR(1) 500A is an SMR for precharge that is connected prior to connection of SMR(2) 504A and prevents an inrush current from flowing into inverter 240A. SMR(2) 504A is connected in parallel to SMR(1) 500A and limiting resistor 502A, and is connected after precharge ends. Each SMR is controlled by ECU 8000.

Monitoring unit 222 detects a current value IB(1), a voltage value VB(1), a temperature and the like of first battery 220, and outputs the result of detection to ECU 8000. Monitoring unit 222A detects a current value IB(2), a voltage value VB(2), a temperature and the like of second battery 220A, and outputs the result of detection to ECU 8000.

Furthermore, a voltmeter 512 for detecting a voltage value VL(1) across capacitor C(1) 510, a voltmeter 512A for detecting a voltage value VL(2) across capacitor C(2) 510A, and a voltmeter 522 for detecting a voltage value VH (hereinafter also referred to as a voltage value of inverter 240 or a system voltage value) across capacitor C(3) 520 are connected to ECU 8000. It is noted that, since the precharge process has ended and SMR(1) 500 and 500A as well as SMR(2) 504 and 504A are in a connected state while the vehicle is running, VL(1) and VL(2) are approximately the same as voltage value VB(1) of first battery 220 and voltage value VB(2) of second battery 220A, respectively.

Based on an ignition switch and a start switch (both are not shown), the amount of press-down of an accelerator pedal (not shown), the amount of press-down of a brake pedal (not shown) and the like, ECU 8000 executes a program stored in a ROM (Read Only Memory), controls inverter 240 and each SMR, and drives the vehicle in a desired state requested by the driver.

The control apparatus according to the present embodiment is characterized in that a switching loss (energy loss) in first boost converter 242 and second boost converter 242A can be accurately suppressed in the hybrid vehicle having the above-described power supply circuit.

Figure 3:
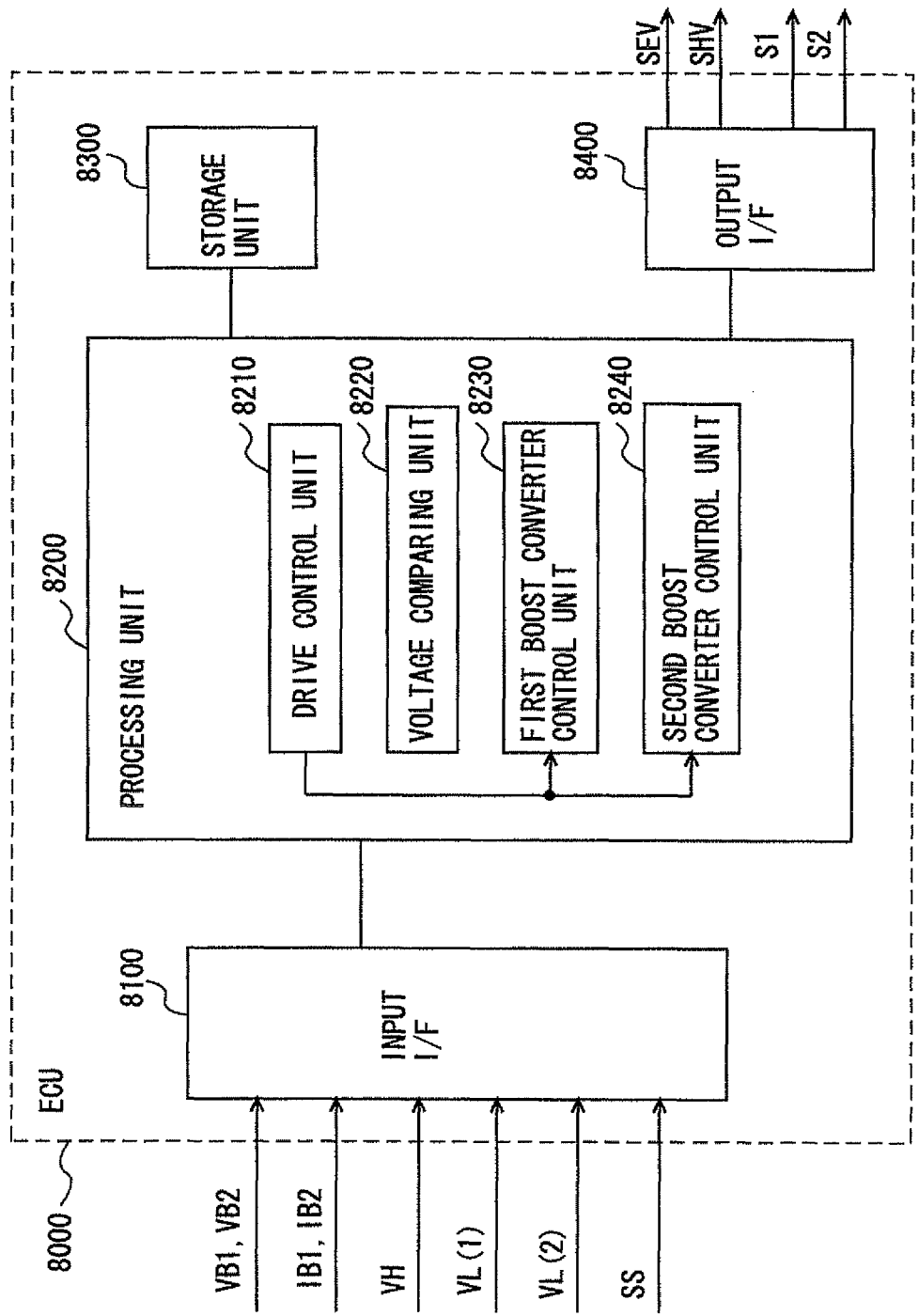
FIG. 3 is a functional block diagram of the control apparatus according to the first embodiment of the present invention.

FIG. 3 shows a functional block diagram of ECU 8000 serving as the control apparatus for the vehicle according to the present embodiment. ECU 8000 includes an input interface 8100, a processing unit 8200, a storage unit 8300, and an output interface 8400.

Input interface 8100 receives current value IB(1) and voltage value VB(1) of first battery 220 from monitoring unit 222, current value IB(2) and voltage value VB(2) of second battery 220A from monitoring unit 222A, voltage value VL(1) across capacitor C(1) 510 from voltmeter 512, voltage value VL(2) across capacitor C(2) 510A from voltmeter 512A, system voltage value VH from voltmeter 522, and signal SS from sports mode selecting switch 302, and transmits these to processing unit 8200.

Storage unit 8300 stores various kinds of information, programs, threshold values, maps and the like, and processing unit 8200 reads or stores the data when necessary.

Processing unit 8200 includes a drive control unit 8210, a voltage comparing unit 8220, a first boost converter control unit 8230, and a second boost converter control unit 8240.

Drive control unit 8210 determines whether to perform the EV drive control or the HV drive control, based on the information input to input interface 8100, the threshold values stored in storage unit 8300, and the like. Specifically, drive control unit 8210 calculates a requested voltage value VR of motor generator 140, a value indicating the state of charge of first battery 220 (hereinafter referred to as SOC(1)), and a value indicating the state of charge of second battery 220A (hereinafter referred to as SOC(2)), and determines whether to perform the EV drive control or the HV drive control, based on calculated requested voltage value VR, SOC(1), SOC(2), signal SS from sports mode selecting switch 302, and the like.

When determining to perform the EV drive control, drive control unit 8210 transmits an EV drive control signal SEV to engine ECU 280 and inverter 240 via output interface 8400. As a result, engine 120 is stopped and the hybrid vehicle runs by using only the driving power of motor generator 140. On the other hand, when determining to perform the HV drive control, drive control unit 8210 transmits an HV drive control signal SHV to engine ECU 280 and inverter 240 via output interface 8400. As a result, the hybrid vehicle runs by using the driving power of both engine 120 and motor generator 140.

Voltage comparing unit 8220 compares voltage value VL(1) across capacitor C(1) 510 and requested voltage value VR, and in addition, compares voltage value VL(1) across capacitor C(1) 510 and voltage value VL(2) across capacitor C(2) 510A. It is noted that voltage value VB(1) of first battery 220 and voltage value VB(2) of second battery 220A may be used instead of VL(1) and VL(2), respectively.

Based on the control (the EV drive control or the HV drive control) performed by drive control unit 8210 and the result of comparison by voltage comparing unit 8220, first boost converter control unit 8230 generates a control signal S1 for controlling actuation of first boost converter 242 (ON/OFF of upper arm 312 and lower arm 313) to reduce the switching loss in first boost converter 242. First boost converter control unit 8230 outputs generated control signal S1 to first boost converter 242 via output interface 8400.

Based on the control (the EV drive control or the HV drive control) performed by drive control unit 8210, second boost converter control unit 8240 generates a control signal S2 for controlling actuation of second boost converter 242A (ON/OFF of upper arm 312A and lower arm 313A) to reduce the switching loss in second boost converter 242A. Second boost converter control unit 8240 outputs generated control signal S2 to second boost converter 242A via output interface 8400.

Although, in the present embodiment, drive control unit 8210, voltage comparing unit 8220, first boost converter control unit 8230, and second boost converter control unit 8240 are each described as functioning as software implemented by a CPU as processing unit 8200 executing a program stored in storage unit 8300, they may be implemented by hardware. It is noted that such a program is recorded in a storage medium and mounted on the vehicle.

A control structure of a program executed in ECU 8000 serving as the control apparatus according to the present embodiment will be described with reference to FIG. 4. It is noted that this program is repeatedly executed at a predetermined cycle time.

In step (the step will be abbreviated as "S" hereinafter) 100, ECU 8000 calculates requested voltage value VR of motor generator 140. For example, ECU 8000 calculates torque requested by the driver, based on the amount of press-down of the accelerator pedal, and calculates requested voltage value VR of motor generator 140 based on the calculated torque and the rotation speed of motor generator 140.

In S102, ECU 8000 calculates SOC(1) of first battery 220 based on an integrated value (history) of current value IB(1) of first battery 220.

In S104, ECU 8000 calculates SOC(2) of second battery 220A based on an integrated value (history) of current value IB(2) of second battery 220A.

In S106, ECU 8000 determines whether or not SOC(1) of first battery 220 is smaller than a predetermined threshold value $\alpha$, or whether or not SOC(2) of second battery 220A is smaller than a predetermined threshold value $\beta$. Threshold value $\alpha$ and threshold value $\beta$ are set in accordance with the control lower limit value of the SOC of each battery. For example, when the control lower limit value of each battery is 20%, threshold value $\alpha$ and threshold value $\beta$ are set to a value higher than 20% by approximately several percents. It is noted that threshold value $\alpha$ may be the same as threshold value $\beta$. If SOC(1) is smaller than $\alpha$ or SOC(2) is smaller than $\beta$ (YES in S106), the process proceeds to S120. If not (NO in S106), the process proceeds to S108.

In S108, ECU 8000 performs the EV drive control. In S110, ECU 8000 actuates both first boost converter 242 and second boost converter 242A. At this time, ECU 8000 performs switching of first boost converter 242 and second boost converter 242A such that system voltage value VH becomes higher than requested voltage value VR of motor generator 140.

In S120, ECU 8000 performs the HV drive control. In S122, ECU 8000 determines whether or not the sports mode has been selected by the driver. If the sports mode has been selected (YES in S122), the process proceeds to S110. If not (NO in S122), the process proceeds to S124.

In S124, ECU 8000 stops second boost converter 242A. In other words, ECU 8000 turns off (disconnects) upper arm 312A and lower arm 313A of second boost converter 242A.

In S126, ECU 8000 determines whether or not voltage value VL(1) across capacitor C(1) 510 is higher than requested voltage value VR. It is noted that voltage value VB(1) of first battery 220 may be used instead of VL(1). If VL(1) is higher than requested voltage value VR (YES in S126), the process proceeds to S128. If not (NO in S126), the process proceeds to S132.

In S128, ECU 8000 determines whether or not voltage value VL(1) across capacitor C(1) 510 is higher than voltage value VL(2) across capacitor C(2) 510A. It is noted that, in this processing, ECU 8000 may determine whether or not voltage value VB(1) of first battery 220 is higher than voltage value VB(2) of second battery 220A. If VL(1) is higher than VL(2) (YES in S128), the process proceeds to S130. If not (NO in S128), the process proceeds to S132.

In S130, ECU 8000 actuates first boost converter 242 to maintain upper arm 312 of first boost converter 242 in the ON state and maintain lower arm 313 in the OFF state.

In S132, ECU 8000 actuates first boost converter 242. At this time, ECU 8000 actuates first boost converter 242 such that system voltage value VH becomes higher than requested voltage value VR of motor generator 140 and system voltage value VH becomes higher than voltage value VL(2) across capacitor C(2) 510A (i.e., voltage value VB(2) of second battery 220A).

The operation of first boost converter 242 and second boost converter 242A will be described, which is controlled by ECU 8000 serving as the control apparatus according to the present embodiment, based on the structure and the flowchart as described above.

It is assumed that SOC(1) of first battery 220 falls below threshold value a while the vehicle is running in the EV drive mode (YES in S106). In this case, a shift from the EV drive mode to the HV drive mode occurs (S120).

If the sports mode has not been selected by the driver at this shift (NO in S122), that is, if the driver does not place importance on the acceleration performance, second boost converter 242A is stopped (upper arm 312A and lower arm 313A are both disconnected). As a result, after the shift to the HV drive mode, the power loss is not produced in second boost converter 242A.

It is noted that, due to stop of second boost converter 242A, SOC(2) of second battery 220A is maintained at a value at the shift to the HV drive mode. On the other hand, SOC(1) of first battery 220 is controlled to fall within at least a prescribed control range due to the HV drive control. Therefore, first battery 220 and second battery 220A are both maintained in the prescribed control range, and the SOC of one battery (here, first battery 220) never decreases extremely.

Even when electric power that can be supplied to motor generator 140 decreases due to stop of second boost converter 242A, the hybrid vehicle can run by using the driving power of engine 120 in the HV drive mode, and thus, the vehicle's driving performance is ensured.

Furthermore, if voltage value VB(1) of first battery 220 is higher than requested voltage value VR (YES in S126) and is higher than voltage value VB(2) of second battery 220A (YES in S128), upper arm 312 of first boost converter 242 is maintained in the ON state and lower arm 313 is maintained in the OFF state (S130). As a result, the power loss produced in first boost converter 242 can also be reduced.

When upper arm 312 is maintained in the ON state as described above, voltage value VB(1) of first battery 220 is supplied as it is to inverter 240 without being boosted. At this time, voltage value VB(1) of first battery 220 is higher than requested voltage value VR, and thus, the driving performance requested by the driver is ensured. In addition, system voltage value VH becomes equal to voltage value VB(1) of first battery 220. Voltage value VB(1) of first battery 220 is, however, higher than voltage value VB(2) of second battery 220A, and thus, a current from second battery 220A never flows into inverter 240 or first battery 220 via diode 314A unnecessarily.

As described above, according to the control apparatus of the present embodiment, in the hybrid vehicle including two power supply circuit units each having the battery and the boost converter, the operation of one boost converter is continued and the other boost converter is stopped when the shift from the EV drive mode to the hybrid drive mode occurs due to a decrease in the amount of charging of each battery. As a result, the power loss produced in the boost converters can be suppressed, as compared with a power loss produced when both of the boost converters are actuated.

<Second Embodiment>

A control apparatus according to a second embodiment of the present invention will be described hereinafter. In the above-described control apparatus according to the first embodiment, second boost converter 242A is constantly stopped unless the sports mode is selected while the HV drive control is being performed (S120, S122 and S124 in FIG. 4). In contrast to this, in the control apparatus according to the present embodiment, when a prescribed condition is satisfied even while the HV drive control is being performed (even while second boost converter 242A is in a stopped state), second boost converter 242A is temporarily actuated to charge/discharge second battery 220A. The remaining structure and process are the same as those of the above-described first embodiment. Accordingly, detailed description of the same structure and process as those of the above-described first embodiment will not be repeated here.

Figure 5:
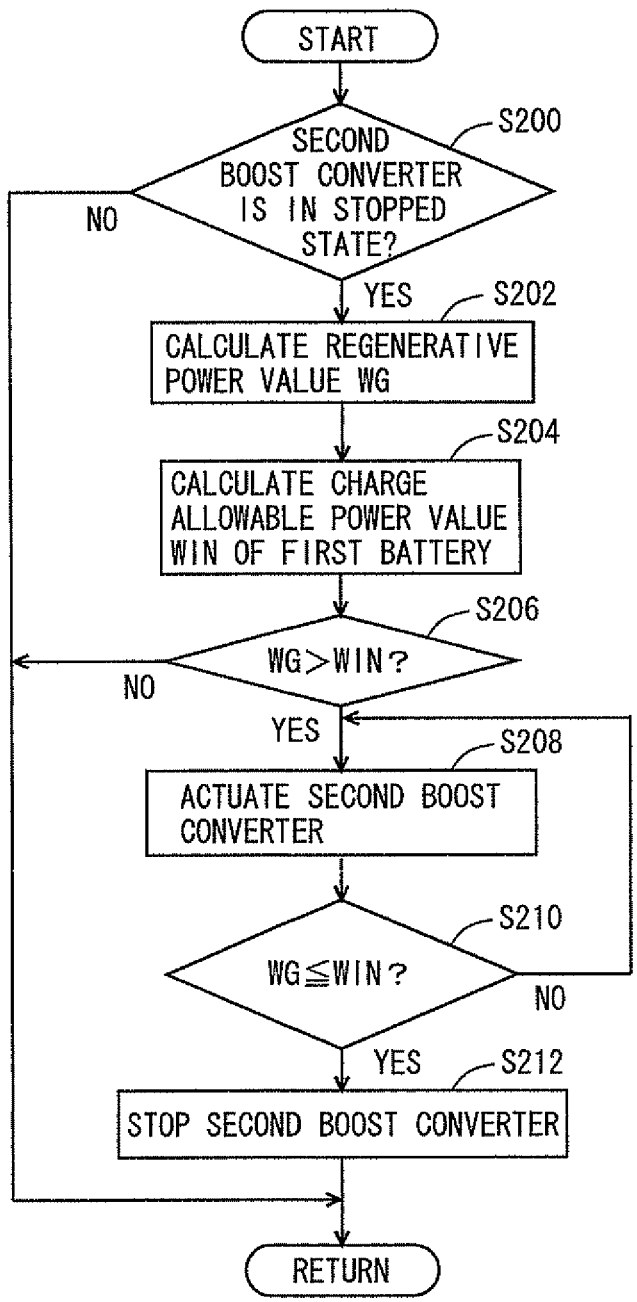
FIG. 5 is a flowchart (No. 1) illustrating a control structure of an ECU configuring a control apparatus according to a second embodiment of the present invention.

A control structure of a program executed when ECU 8000 serving as the control apparatus according to the present embodiment temporarily actuates second boost converter 242A to charge second battery 220A while the HV drive control is being performed will be described with reference to FIG. 5.

Figure 4:
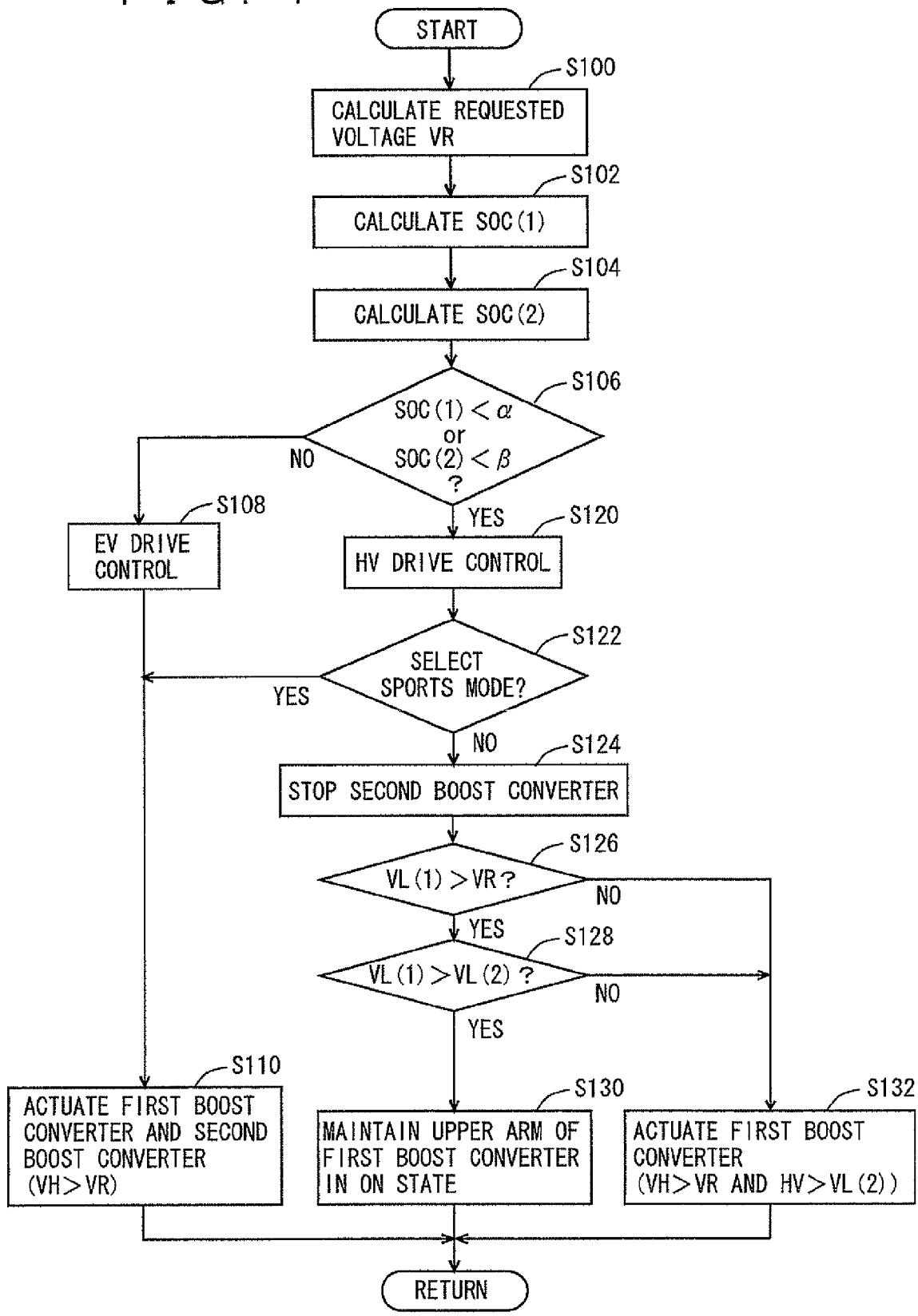
FIG. 4 is a flowchart illustrating a control structure of an ECU configuring the control apparatus according to the first embodiment of the present invention.

In S200, ECU 8000 determines whether or not the HV drive control is being performed and second boost converter 242A is in the stopped state (the processing in S124 in FIG. 4 is being performed). If second boost converter 242A is in the stopped state (YES in S200), the process proceeds to S202. If not (NO in S200), this process ends.

In S202, ECU 8000 calculates a regenerative power value WG generated by motor generator 140.

In S204, ECU 8000 calculates a charge allowable power value WIN of first battery 220 based on a signal (e.g., a temperature of first battery 220 and the like) from monitoring unit 222. It is noted that charge allowable power value WIN of first battery 220 may be stored in advance.

In S206, ECU 8000 determines whether or not regenerative power value WG exceeds charge allowable power value WIN of first battery 220. If regenerative power value WG exceeds charge allowable power value WIN (YES in S206), the process proceeds to S208. If not (NO in S206), this process ends.

In S208, ECU 8000 actuates second boost converter 242A. At this time, ECU 8000 actuates second boost converter 242A to minimize charging power of second battery 220A. For example, ECU 8000 actuates second boost converter 242A such that second battery 220A is charged with only the electric power exceeding charge allowable power value WIN out of the electric power defined by regenerative power value WG. It is noted that, as a result of actuation of first boost converter 242, first battery 220 is charged with the electric power defined by charge allowable power value WIN out of the electric power defined by regenerative power value WG.

In S210, ECU 8000 determines whether or not regenerative power value WG becomes equal to or lower than charge allowable power value WIN. If regenerative power value WG becomes equal to or lower than charge allowable power value WIN (YES in S210), the process proceeds to S212. If not (NO in S210), the process, returns to S208 and charging of second battery 220A (the operation of second boost converter 242A) is continued. In S212, ECU 8000 stops second boost converter 242A again.

Figure 6:
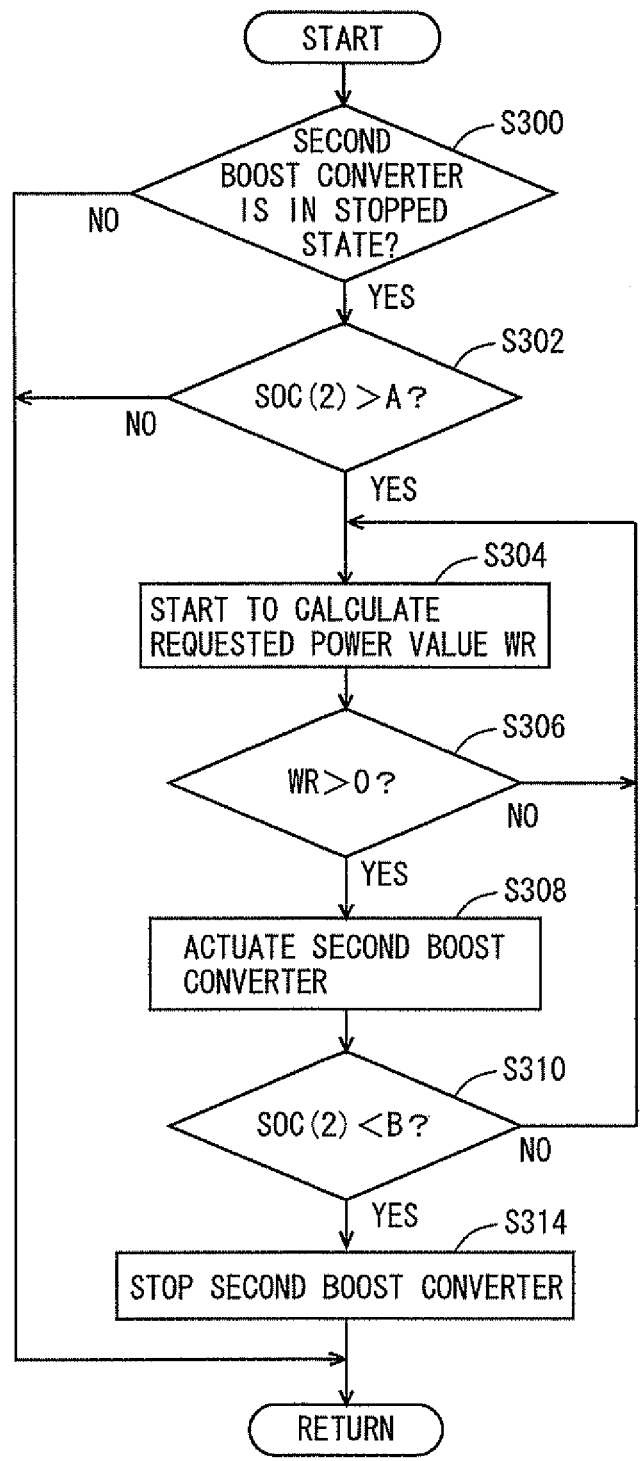
FIG. 6 is a flowchart (No. 2) illustrating a control structure of the ECU configuring the control apparatus according to the second embodiment of the present invention.

A control structure of a program executed when ECU 8000 serving as the control apparatus according to the present embodiment temporarily actuates second boost converter 242A to discharge second battery 220A while the HV drive control is being performed will be described with reference to FIG. 6.

In S300, ECU 8000 determines whether or not the HV drive control is being performed and second boost converter 242A is in the stopped state (the processing in S124 in FIG. 4 is being performed). If second boost converter 242A is in the stopped state (YES in S300), the process proceeds to S302. If not (NO in S300), this process ends.

In S302, ECU 8000 determines whether or not SOC(2) of second battery 220A exceeds a predetermined threshold value A. It is noted that this processing is for determining whether or not an upper arm ON control time period of first boost converter 242 (a time period during which the processing in S130 in FIG. 4 is performed) decreases due to an increase in SOC(2). The result of determination in this processing is one of the conditions for determining whether or not to temporarily actuate second boost converter 242A. In other words, when SOC(2)>A, second boost converter 242A is temporarily actuated to decrease SOC(2) (i.e., VB(2)), thereby increasing the upper arm ON control time period. Accordingly, threshold value A is determined based on, for example, the specifications of first battery 220 and second battery 220A such that the amount of reduction in power loss produced due to this increase in the upper arm ON control time period exceeds the amount of power loss produced due to the temporary actuation of second boost converter 242A. If SOC(2) exceeds threshold value A (YES in S302), the process proceeds to S304. If not (NO in S302), this process ends.

In S304, ECU 8000 starts to calculate a requested power value WR of motor generator 140. For example, ECU 8000 calculates torque requested by the driver, based on the amount of press-down of the accelerator pedal, and calculates requested power value WR of motor generator 140 based on the calculated torque and the rotation speed of motor generator 140. ECU 8000 calculates requested power value WR as a positive value when motor generator 140 needs to function as a motor, and calculates requested power value WR as a negative value when motor generator 140 needs to function as a generator.

In S306, ECU 8000 determines whether or not requested power value WR is a positive value (i.e., whether or not motor generator 140 needs to function as a motor). If requested power value WR is a positive value (YES in S306), the process proceeds to S308. If not (NO in S306), the process returns to S304. It is noted that, if second boost converter 242A has already been actuated in a processing in S308 that will be described later when the process returns to S304, the operation of second boost converter 242A is continued and discharging of second battery 220A is continued.

In S308, ECU 8000 actuates second boost converter 242A. At this time, ECU 8000 actuates second boost converter 242A to discharge second battery 220A at a maximum rate. For example, when requested power value WR is in excess of a discharge allowable power value of second battery 220A, ECU 8000 actuates second boost converter 242A such that the discharging power of second battery 220A becomes the discharge allowable power value (i.e., maximum value). It is noted that, as a result of actuation of first boost converter 242, the electric power exceeding the discharging power of second battery 220A out of the electric power defined by requested power value WR is discharged from first battery 220.

In S310, ECU 8000 determines whether or not SOC(2) of second battery 220A falls below a predetermined threshold value B (<threshold value A). It is noted that threshold value B is determined based on the specifications of first battery 220 and second battery 220A, the specifications of the vehicle, and the like. If SOC(2) falls below threshold value B (YES in S310), the process proceeds to S312. If not (NO in S310), the process returns to S304 and discharging of second battery 220A (the operation of second boost converter 242A) is continued. In S314, ECU 8000 stops second boost converter 242A again.

The operation of first boost converter 242 and second boost converter 242A will be described, which is controlled by ECU 8000 serving as the control apparatus according to the present embodiment, based on the structure and the flowchart as described above.

If regenerative power value WG generated by motor generator 140 exceeds charge allowable power value WIN of first battery 220 (YES in S206) while the HV drive control is being performed and second boost converter 242A is in the stopped state (YES in S200), second boost converter 242A is temporarily actuated, and second battery 220A is charged with only the regenerative power exceeding charge allowable power value WIN (S208). As a result, the generated regenerative power can be recovered with no waste. In addition, since the charging power of second battery 220A is minimized, an increase in voltage value VB(2) of second battery 220A is minimized. Therefore, a decrease in the upper arm ON control time period of first boost converter 242 can be minimized.

On the other hand, if SOC(2) of second battery 220A exceeds threshold value A as a result of this charging of second battery 220A (YES in S302) and if requested power value WR>0 (YES in S306), second boost converter 242A is temporarily actuated to discharge second battery 220A at the maximum rate (S308). As a result of this discharging at the maximum rate, voltage value VB(2) of second battery 220A decreases rapidly. As a result, the upper arm ON control time period increases and the power loss of first boost converter 242 can be suppressed.

As described above, according to the control apparatus of the present embodiment, when the prescribed condition is satisfied while the vehicle is running in the hybrid drive mode and the second boost converter is in the stopped state, the second boost converter in the stopped state is temporarily actuated to charge/discharge the battery on the second boost converter side. Therefore, the power loss produced in the boost converters can be suppressed and the regenerative power can also be recovered with no waste.

It should be understood that the embodiments disclosed herein are illustrative and not limitative in any respect. The scope of the present invention is defined by the terms of the claims, rather than the above description, and is intended to include any modifications within the scope and meaning equivalent to the terms of the claims.

Description of the Reference Signs 120 engine; 140 motor generator; 160 driving wheel; 180 reduction gear; 200 power split device; 220 first battery; 220A second battery; 222, 222A monitoring unit; 240 inverter; 242 first boost converter; 242A second boost converter; 280 engine ECU; 300 MG_ECU; 302 sports mode selecting switch; 320 HV_ECU; 311, 311A reactor; 312, 312A, 313, 313A transistor; 314, 314A, 315, 315A diode; 502, 502A limiting resistor; 510 capacitor C(1); 510A capacitor C(2); 512, 512A, 522 voltmeter; 520 capacitor C(3); ECU 8000; 8100 input interface; 8200 processing unit; 8210 drive control unit; 8220 voltage comparing unit; 8230 first boost converter control unit; 8240 second boost converter control unit; 8300 storage unit; 8400 output interface

The invention claimed is:

1. A control apparatus for a hybrid vehicle using at least any one of an internal combustion engine and a rotating electric machine as a power source, said hybrid vehicle comprising: a first power storage device; a first voltage converting device for converting an output voltage of said first power storage device and outputting the output voltage to said rotating electric machine; a second power storage device; and a second voltage converting device for converting an output voltage of said second power storage device and outputting the output voltage to said rotating electric machine, said control apparatus including:
a drive control unit for performing any one of hybrid drive control for driving said hybrid vehicle by using driving power of both said internal combustion engine and said rotating electric machine, and electric drive control for driving said hybrid vehicle by using only driving power of said rotating electric machine; and
a control unit for controlling said first voltage converting device and said second voltage converting device to actuate both said first voltage converting device and said second voltage converting device during said electric drive control by said drive control unit, and to actuate said first voltage converting device and stop said second voltage converting device during said hybrid drive control by said drive control unit.

2. The control apparatus for a hybrid vehicle according to claim 1, wherein
said first voltage converting device and said second voltage converting device are coupled in parallel to said rotating electric machine,
said first voltage converting device has a first switching element and a second switching element serially coupled to said rotating electric machine,
a positive electrode of said first power storage device is coupled to an intermediate point between said first switching element and said second switching element,
a negative electrode of said first power storage device is coupled to a negative electrode side of said second switching element, and
said control unit actuates said first voltage converting device to maintain said first switching element in an ON state and said second switching element in an OFF state, when the output voltage of said first power storage device is larger than the output voltage of said second power storage device during said hybrid drive control.

3. The control apparatus for a hybrid vehicle according to claim 2, wherein
said control unit determines whether or not an ON time period during which said first switching element can be maintained in said ON state decreases due to fluctuations in the output voltage of at least any one of said first power storage device and said second power storage device, during said hybrid drive control and while said second voltage converting device is in a stopped state, and when determining that said ON time period decreases, said control unit temporarily actuates said second voltage converting device such that electric power of said second power storage device is output to said rotating electric machine.

4. The control apparatus for a hybrid vehicle according to claim 3, wherein
said control unit determines that said ON time period decreases and temporarily actuates said second voltage converting device when a value indicating a state of charge of said second power storage device exceeds a predetermined first threshold value during said hybrid drive control, and stops said second voltage converting device again when the value indicating the state of charge of said second power storage device falls below a predetermined second threshold value during temporary actuation of said second voltage converting device.

5. The control apparatus for a hybrid vehicle according to claim 3, wherein
said control unit calculates a requested power value of said rotating electric machine, and temporarily actuates said second voltage converting device only for a time period during which said requested power value exceeds a predetermined requested power value.

6. The control apparatus for a hybrid vehicle according to claim 3, wherein
said control unit actuates said second voltage converting device such that discharging power of said second power storage device becomes larger than discharging power of said first power storage device, when said control unit temporarily actuates said second voltage converting device.

7. The control apparatus for a hybrid vehicle according to claim 1, wherein
said first voltage converting device and said second voltage converting device are coupled in parallel to said rotating electric machine, and
said control unit actuates said first voltage converting device such that an output voltage of said first voltage converting device becomes larger than the output voltage of said second power storage device, when the output voltage of said first power storage device is smaller than the output voltage of said second power storage device during said hybrid drive control.

8. The control apparatus for a hybrid vehicle according to claim 1, wherein
said control unit calculates a regenerative power value generated by said rotating electric machine, and temporarily actuates said second voltage converting device such that said first power storage device and said second power storage device are both charged with regenerative power generated by said rotating electric machine, when said regenerative power value exceeds a predetermined power value during said hybrid drive control and while said second voltage converting device is in a stopped state.

9. The control apparatus for a hybrid vehicle according to claim 8, wherein
said predetermined power value is determined based on a charge allowable power value of said first power storage device.

10. The control apparatus for a hybrid vehicle according to claim 8, wherein
said control unit actuates said second voltage converting device such that said second power storage device is charged with electric power exceeding a charge allowable power value of said first power storage device out of said regenerative power, when said control unit temporarily actuates said second voltage converting device.

11. The control apparatus for a hybrid vehicle according to claim 1, wherein
said drive control unit determines whether or not a value indicating a state of charge of any one of said first power storage device and said second power storage device is smaller than a prescribed value, and performs said hybrid drive control when said drive control unit determines that the value indicating said state of charge is smaller than said prescribed value, and performs said electric drive control when said drive control unit does not determine that the value indicating said state of charge is smaller than said prescribed value.

12. A control method by a control apparatus for controlling a hybrid vehicle using at least any one of an internal combustion engine and a rotating electric machine as a power source, said hybrid vehicle comprising: a first power storage device; a first voltage converting device for converting an output voltage of said first power storage device and outputting the output voltage to said rotating electric machine; a second power storage device; and a second voltage converting device for converting an output voltage of said second power storage device and outputting the output voltage to said rotating electric machine,
said control method including the steps of:
performing any one of hybrid drive control for driving said hybrid vehicle by using driving power of both said internal combustion engine and said rotating electric machine, and electric drive control for driving said hybrid vehicle by using only driving power of said rotating electric machine; and
controlling said first voltage converting device and said second voltage converting device to actuate both said first voltage converting device and said second voltage converting device during said electric drive control by said step of performing drive control, and to actuate said first voltage converting device and stop said second voltage converting device during said hybrid drive control by said step of performing drive control.

13. The control method for a hybrid vehicle according to claim 12, wherein
said first voltage converting device and said second voltage converting device are coupled in parallel to said rotating electric machine,
said first voltage converting device has a first switching element and a second switching element serially coupled to said rotating electric machine,
a positive electrode of said first power storage device is coupled to an intermediate point between said first switching element and said second switching element,
a negative electrode of said first power storage device is coupled to a negative electrode side of said second switching element, and
the step of controlling said first voltage converting device and said second voltage converting device includes the step of actuating said first voltage converting device to maintain said first switching element in an ON state and said second switching element in an OFF state, when the output voltage of said first power storage device is larger than the output voltage of said second power storage device during said hybrid drive control.

14. The control method for a hybrid vehicle according to claim 13, wherein
the step of controlling said first voltage converting device and said second voltage converting device includes the step of determining whether or not an ON time period during which said first switching element can be maintained in said ON state decreases due to fluctuations in the output voltage of at least any one of said first power storage device and said second power storage device, during said hybrid drive control and while said second voltage converting device is in a stopped state, and when determining that said ON time period decreases, temporarily actuating said second voltage converting device such that electric power of said second power storage device is output to said rotating electric machine.

15. The control method for a hybrid vehicle according to claim 14, wherein
the step of controlling said first voltage converting device and said second voltage converting device includes the step of determining that said ON time period decreases and temporarily actuating said second voltage converting device when a value indicating a state of charge of said second power storage device exceeds a predetermined first threshold value during said hybrid drive control, and stopping said second voltage converting device again when the value indicating the state of charge of said second power storage device falls below a predetermined second threshold value during temporary actuation of said second voltage converting device.

16. The control method for a hybrid vehicle according to claim 14, wherein
the step of controlling said first voltage converting device and said second voltage converting device includes the step of calculating a requested power value of said rotating electric machine, and temporarily actuating said second voltage converting device only for a time period during which said requested power value exceeds a predetermined requested power value.

17. The control method for a hybrid vehicle according to claim 14, wherein
the step of controlling said first voltage converting device and said second voltage converting device includes the step of actuating said second voltage converting device such that discharging power of said second power storage device becomes larger than discharging power of said first power storage device, when said second voltage converting device is temporarily actuated.

18. The control method for a hybrid vehicle according to claim 12, wherein
said first voltage converting device and said second voltage converting device are coupled in parallel to said rotating electric machine, and
the step of controlling said first voltage converting device and said second voltage converting device includes the step of actuating said first voltage converting device such that an output voltage of said first voltage converting device becomes larger than the output voltage of said second power storage device, when the output voltage of said first power storage device is smaller than the output voltage of said second power storage device during said hybrid drive control.

19. The control method for a hybrid vehicle according to claim 12, wherein
the step of controlling said first voltage converting device and said second voltage converting device includes the step of calculating a regenerative power value generated by said rotating electric machine, and temporarily actuating said second voltage converting device such that said first power storage device and said second power storage device are both charged with regenerative power generated by said rotating electric machine, when said regenerative power value exceeds a predetermined power value during said hybrid drive control and while said second voltage converting device is in a stopped state.

20. The control method for a hybrid vehicle according to claim 19, wherein
said predetermined power value is determined based on a charge allowable power value of said first power storage device.

21. The control method for a hybrid vehicle according to claim 19, wherein
the step of controlling said first voltage converting device and said second voltage converting device includes the step of actuating said second voltage converting device such that said second power storage device is charged with electric power exceeding a charge allowable power value of said first power storage device out of said regenerative power, when said second voltage converting device is temporarily actuated.

22. The control method for a hybrid vehicle according to claim 12, wherein
said step of performing drive control includes the step of determining whether or not a value indicating a state of charge of any one of said first power storage device and said second power storage device is smaller than a prescribed value, and performing said hybrid drive control when it is determined that the value indicating said state of charge is smaller than said prescribed value, and performing said electric drive control when it is not determined that the value indicating said state of charge is smaller than said prescribed value.

\* \* \* \* \*